United States Patent [19]

Hauptmann et al.

[11] 4,367,472

[45] Jan. 4, 1983

[54] CIRCUIT ARRANGEMENT FOR SIDE LOBE SUPPRESSION IN RADAR APPARATUSES

[75] Inventors: Rudolf Hauptmann, Munich; Gerhard Foeller, Soecking, both of Fed. Rep. of Germany

[73] Assignee: Siemens Aktiengesellschaft, Berlin & Munich, Fed. Rep. of Germany

[21] Appl. No.: 181,760

[22] Filed: Aug. 27, 1980

[30] Foreign Application Priority Data

Sep. 28, 1979 [DE] Fed. Rep. of Germany ....... 2939511
Sep. 28, 1979 [DE] Fed. Rep. of Germany ....... 2939512
Oct. 23, 1979 [DE] Fed. Rep. of Germany ....... 2942778

[51] Int. Cl.[3] .......... H04B 1/10; G01S 7/02
[52] U.S. Cl. .......... 343/7 A; 343/100 LE
[58] Field of Search .......... 343/7 A, 100 LE

[56] References Cited

U.S. PATENT DOCUMENTS 3,881,177 4/1975 Len et al. .......... 343/100 LE X
4,162,497 7/1979 Hulland et al. .......... 343/100 LE
4,286,268 8/1981 Daniel et al. .......... 343/100 LE

OTHER PUBLICATIONS

Military Microwave Conference, London 1978, pp. 366–377, entitled "Adaptive Arrays and Sidelobe Cancellers for Communications and Radar Applications" by D. Hicks and G. Raymond.

*Primary Examiner*—T. H. Tubbesing

*Attorney, Agent, or Firm*—Hill, Van Santen, Steadman, Chiara & Simpson

[57] ABSTRACT

A circuit arrangement for side lobe suppression in radar wherein the undesired signals which arrive at the radar receiver by way of the side lobes of the antenna are cancelled by using a compensation circuit formed as a loop. Additional circuit means for the formation of a weighting factor for the weighting multiplier are provided in the feedback of the loop between a correlator and a weighting amplifier.

When the noise power at the output of the compensating circuit is greater than the noise power that the radar receiver supplies without the compensation circuit, the output will be switched from the compensation circuit to a direct output of the radar receiver. The comparison of the noise power in a comparator then supplies the control signal for the change-over. The change-over can also occur as a function of thermal noises when the amount of the weighting factor exceeds a predetermined value. The weighting factor is monitored by a control circuit. So as to make the response behaviour of the compensated loop independent of the noise signal power, a controlled amplifier is incorporated in the control circuit with the gain of the amplifier being inversely proportional to the square of the noise amplitude in the auxiliary channel. The controlled amplifier can be mounted in the feedback branch between the correlator and the weighting multiplier or can be inserted in front of one of the two inputs of the correlator.

5 Claims, 3 Drawing Figures

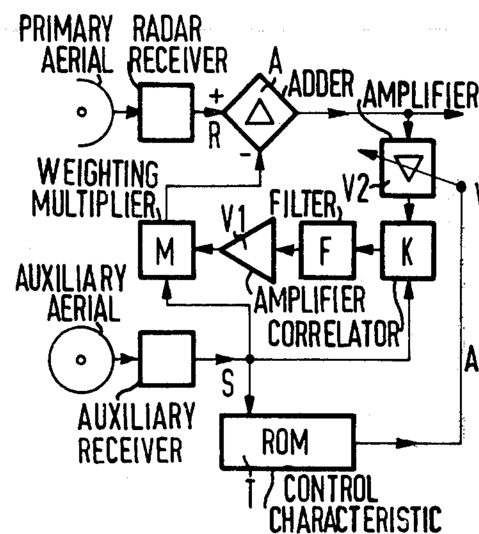

FIG 2
PRIMARY AERIAL
RADAR RECEIVER
A
ADDER
AMPLIFIER
+
R
-
WEIGHTING MULTIPLIER
V2
V1
FILTER
M
F
K
AUXILIARY AERIAL
AMPLIFIER
CORRELATOR
S
AUXILIARY RECEIVER
ROM
T
CONTROL CHARACTERISTIC

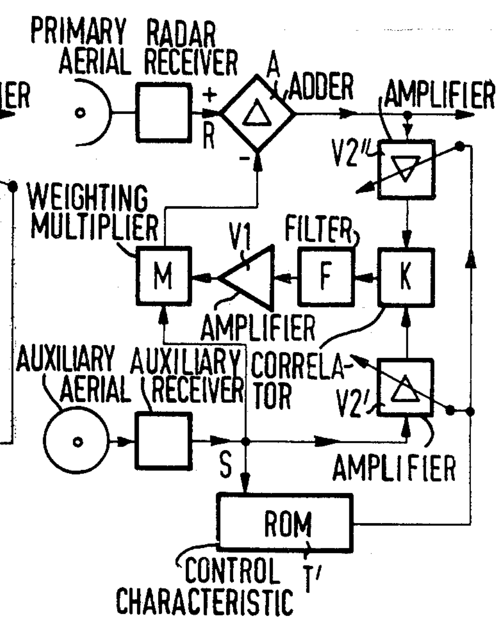

FIG 3
PRIMARY AERIAL
RADAR RECEIVER
A
ADDER
AMPLIFIER
+
R
-
V2''
WEIGHTING MULTIPLIER
V1
FILTER
M
F
K
AMPLIFIER
AUXILIARY AERIAL
AUXILIARY RECEIVER
CORRELA-TOR
V2'
S
AMPLIFIER
ROM
CONTROL CHARACTERISTIC
T'

CIRCUIT ARRANGEMENT FOR SIDE LOBE SUPPRESSION IN RADAR APPARATUSES

BACKGROUND OF THE INVENTION

1. Field of the Invention

This invention relates in general to radar devices and in particular to a circuit arrangement for side lobe suppression in a radar device utilizing a loop as part of a compensating circuit in which an undesired signal received by way of the side lobes of the radar antenna is compensated in an adder using an auxiliary signal obtained with an omnidirectional auxiliary or phantom antenna after it has been weighted in a weighting multiplier using a weighting factor developed in a feedback branch between a correlator and the weighting multiplier of the side lobe canceller (SLC).

2. Description of the Prior Art

Undesired signals received by side lobes of a radar antenna can result in a significant degradation in the radar receiver in the processing of useful signals. This undesired result becomes particularly evident when it is desired to use small antennas in conjunction with high antenna gain in the direction of maximum radiation to result in reduced side lobe attenuation. The antenna reflector is illuminated to the greatest possible degree by the primary radiator. This results in side lobes arising to an increased degree and said side lobes make it easier for a source of unwanted signals or jamming signals to pass into the radar signal and disrupt the signal processing procedure even when the major lobe of the radar antenna is not directed toward the source of the unwanted or jamming signals. A source of unwanted or jamming signals of sufficient strength can thus substantially reduce the effectiveness of the radar over its entire azimuth detection range.

It has previously been known to selectively attenuate the noise energy by means of so-called side lobes suppression without significantly influencing the signal received from the major lobe.

One of the known circuits for side lobes suppression functions according to the principal of cancelling the noise signal and is designated as a "side lobe canceller" (SLC). In addition to the radar receiver and its antenna such prior art circuit requires a section reception branch with an auxiliary or phantom antenna which has omnidirectional characteristics. Such circuit functions in that a signal received in the side lobe range of the primary antenna is also received on the auxiliary or phantom antenna and is rotated or respectively attenuated in the second reception branch as to phase and amplitude by means of a control loop such that it is equal to the signal from the primary channel. By subtracting the two signals, it is possible to cancel the noise signal as described in the publication MIL. Microwave Conference, London 1978, Page 370.

The two reception branches are linked to each other with a loop which consists of an adder, a weighting multiplier for the auxiliary signal and a correlator which generates a weighting factor for the weighting multiplier in a feedback branch and utilizes a circuit for the mean value formation and further includes an amplifier.

Only the noise signals occurring in the side lobe range of the radar antenna are to be eliminated with such a circuit arrangement. Targets detected by the major lobe of the radar antenna in contrast are to be received with as little attenuation as possible. A possibility of reducing the effect of the loop exists in that the weighting factor for the weighting multiplier is limited to a predetermined value, for example, a value of 1. This method, however, has the disadvantage that the signal voltage of a desired target is attenuated in the ratio of the gain of the auxiliary or phantom antenna/gain of the radar major lobe. Moreover, the thermal noise of the auxiliary channel is added in full strength (given amount 1) in the range of the major lobe into the radar channel whereby the signal to noise ratio of the target signal is reduced.

When predominantly indirect reception of a noise signal in a high reflection environment occurs, the signals in the radar and auxiliary channels can be uncorrelated as a result of multi-path propagation or wide angle diffuse reflection. Since in this case, the correlation product between the radar and auxiliary signal will be zero, the weighting factor formed in the loop will under certain conditions retain its previous value. This property can have a negative influence on the output signal of the radar channel since the noise energy evaluated with the weighting factor effective at such time will be added into the radar channel.

The prior art circuit for side lobe suppression has the disadvantage that the transient response of its loop depends on the noise signal power. Usually, the loop is formed in a manner such that with low signal noise levels the drag error is still tolerable and a high noise signal level does not produce self-excitation of the loop.

Although the loop dynamics can generally be adapted to the noise level dynamics utilizing loops which function in an analog manner, the dynamics of digitally functioning loops is not sufficient in all cases due to the stability limit which depends on the scanning rate. It then becomes necessary to accept a drag or timing error or to limit the noise power. Given SLC circuits which are formed in analog technology, an automatic gain control (AGC) can be provided in the auxiliary channel which maintains the signal level constant. This control, however, deteriorates the dynamic behaviour of the circuit when amplitude-modulated noise sources or jammer sources occur. A sudden boost of the noise amplitude thus results in an output signal until the weighting signal has responded to the new value.

SUMMARY OF THE INVENTION

It is an object of the present invention to avoid degradation of the echo signals from the desired targets without reducing the effect of the noise suppression in the side lobe range. Thereby, the noise power is also reduced in the radar channel. Also, a further object is that in avoiding the constriction of the dynamic range of the loop so that the loop independently of the noise level functions with an optimum time constant so as to produce the smallest possible error. The circuit arrangement for side lobe suppression of the invention is designed such that a monitoring circuit (KP1) for the amount of the weighting function is provided in a feedback branch of the loop with the monitoring circuit (KP1) disabling the circuit arrangement for the side lobe suppression when a predetermined value is exceeded. Also, the noise power before and after an adder A of the SLC circuit in the radar channel is subjected to a comparison measurement and at the output of the radar channel when preponderance of the measured value at the output side of the adder A is connected to the input of the adder of the SLC circuit using a changeover switch U and additionally, a device for gain control for the formation of the weighting factor is provided which effects a gain in the weighting factor which is inversely proportional to the square of the noise amplitude in the auxiliary channel according to the equation ($V=a/S^2$).

If an undisrupted reception signal exists in the radar channel, then the increase of the noise power as a result of the employment of a SLC circuit is prevented by means of a change-over operation. On the other hand, with analog and digital design of the SLC circuit, the dynamic range can be fully utilized. Also, the circuit is not sensitive to fluctuations of the noise amplitude.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 2 illustrates a modification of the invention; and

FIG. 3 illustrates a further modification of the invention.

DESCRIPTION OF THE PREFERRED EMBODIMENTS

Figure 1:
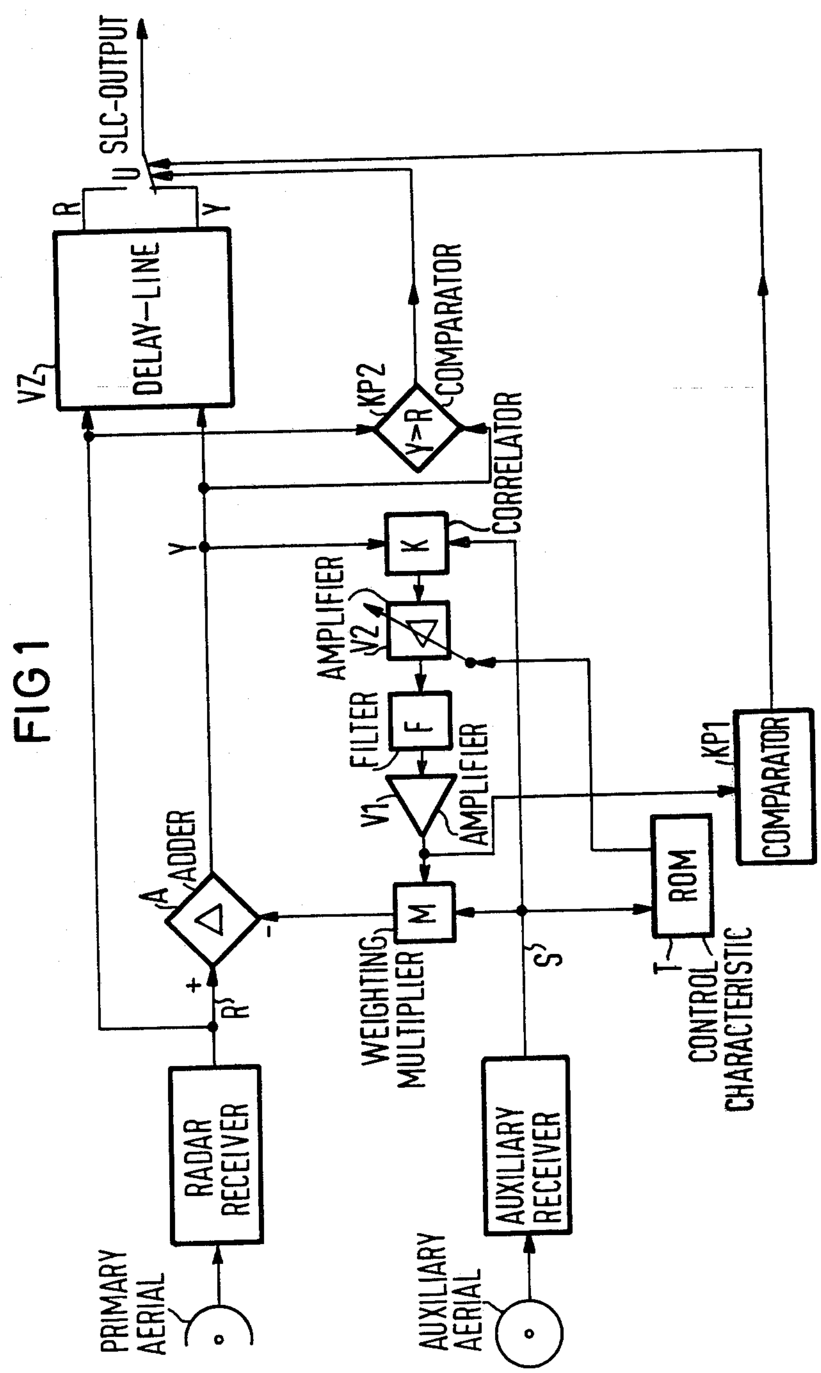
FIG. 1 is a block diagram illustrating the invention.

FIGS. 1, 2 and 3 illustrate sample embodiments of a SLC circuit shown in block diagram form. The circuits differ only due to different arrangements and design of the device for gain control for the weighting factor in the loop. The significant components of the SLC circuit for side lobe suppression of all of the sample embodiments include a primary reception branch having a radar antenna and a primary radar receiver and an auxiliary reception branch with an auxiliary antenna which is designed as an omnidirectional antenna and further includes an auxiliary receiver. The two reception branches are linked to each other through a loop. The output of the arrangement supplies the signals which have been cleaned of the noise disruptions of the side lobe range of the radar antenna to an evaluation circuit not illustrated. The loop of each of the arrangements includes an adder which receives inputs in case of a disruption of the noise signal R of the primary signal branch and a noise signal S from the auxiliary reception branch with the noise signal S being previously subjected to a weighting function in a weighting multiplier M. As shown in FIG. 1, the primary antenna is connected to a radar receiver which produces an output signal R which is supplied to the adder A and also to a delay line VZ. The output of the omnidirectional auxiliary antenna is supplied to an auxiliary receiver which produces an output S which is supplied to a weighting multiplier M which supplies an input to the adder A. The output of the receiver S is also supplied to a control characteristic T which may be a ROM. The signal S is also supplied to a correlator K which also receives the output Y from the adder A. The output Y of the adder is also supplied to the delay line VZ. An amplifier V2 of variable gain receives the output of the correlator K and supplies an output to a filter F which supplies an input to an amplifier V1 which controls the weighting function of the weighting multiplier M. The output of the amplifier V1 is also supplied to a comparator KP1 and the output of the comparator is connected to control a changeover switch U so as to move the switch between the R and Y outputs of the delay line VZ which comprises the output of the SLC circuit. A second comparator KP2 receives the input R from the radar receiver and the output Y of the adder A and also controls the change-over switch U in response to the relationship of these two outputs.

A mean value signal is formed from the output signal of the correlator K in the filter F and the mean value represents the weighting factor for the weighting multiplier M after amplification in the amplifier V1. Thus, the weighting factor of the weighting multiplier is generated in this fashion.

The weighting factor is monitored as to its amplitude in the monitoring comparator circuit KP1 which compares it to a preset level and as soon as the output of the amplifier V1 exceeds a predetermined value upon the occurrence of a noise or jamming source in the major lobe of the radar antenna, the change-over switch U is actuated and switches the output of the SLC circuit from the output of the adder A designated as Y to the input to the adder circuit designated as R. The circuit arrangement for the side lobe suppression continues to function without adverse effect, however, still having an influence on the output signal Y. If the prescribed value of the weighting factor falls below the predetermined amount, then after reconnection the SLC circuit again becomes effective to perform its function. The input and output of the adder A is connected to the comparator circuit KP2 in which a comparison of the noise power R in front of the SLC circuit and the noise power Y at the output of the SLC circuit is accomplished. The output of the comparator circuit KP2 controls the change-over switch U so that the signal to be supplied for further evaluation is selected as a function of the ratio of the two noise powers R and Y before and after the SLC adder. If the average power after the SLC adder is greater than at its input, the output signal will be removed in front of the adder. The change-over which is accomplished with the change-over switch U only occurs after evaluation of the comparative measurement in the comparison circuit KP2. Thus, the delay line VZ is inserted in front of the change-over switch U in the signal pass for the signals R and Y and the delay time of the delay line VZ is equal to or greater than the measuring time in the comparison circuit.

The generation of the weighting factor is influenced by the amplification depending on the amplitude of the noise signal in the auxiliary receiver. For this purpose, the controlled amplifier V2 is connected as shown in FIG. 1 in the feedback path between the output of the correlator K and the filter F and the gain V of the controlled amplifier V2 is determined with the control characteristic stage T which may be a ROM which produces an output of the equation $V=(a/S^2)$ where S represents the amplitude of the noise signal in the auxiliary receiver and a is a factor dependent on the circuit arrangement.

The controlled amplifier V can also be incorporated in the feedback between the filter F and the multiplier M. In this example, it is expedient to combine the amplifier V1 and the controlled amplifier V2 to form a single amplifier unit.

FIG. 2 illustrates a modification of the circuit of FIG. 1 wherein the controlled amplifier V2 is connected between the output of the adder A and the input to the correlator K and the other arrangements of the circuit are similar to that illustrated in FIG. 1. The arrangement of FIG. 2 allows the controlled amplifier V2 to receive the noise-freed signal Y and is controlled by the output of the circuit T which receives the noise signal S from the auxiliary receiver.

If due to reduced demands, the SLC circuit need not function optimally at all noise or jamming source levels, the inventive arrangement makes it possible to provide cost saving in that the controlled amplifier need only be adjustable to two predetermined amplification or gain levels for two fixed amplitude values S1 and S2 of the auxiliary signal. The adjustment of these values occurs as a function of whether a specific power is exceeded in the auxiliary receiver. Such a variation of the sample embodiments according to FIGS. 1 and 2 can be realized in a simple manner by means of a shift of the signal bits when a digital design of the SLC circuit occurs.

FIG. 3 illustrates an additional embodiment of the invention wherein so as to maintain the required dynamics of the controlled amplifier small, the amplification and gain can be divided between two amplifiers V2′ and V2″ whereby the amplification and gain of each of the amplifiers is according to the function of $V=(a/S)$ where V is the gain and S is the noise level and a is a constant. In this arrangement, the amplifiers V2′ and V2″ are connected as shown in FIG. 3 and both are controlled by the output of the control characteristic circuit T′ which varies their gain according to the function of (a/S). Thus, in FIG. 3, the control characteristic circuit T′ supplies gain control signals to the amplifier V2′ which receives the output of the receiver S and supplies an input to the correlator K. The control characteristic circuit T′ also supplies a gain control signal to the amplifier V2″ which receives the output of the adder A and supplies an input to the correlator K.

Although the invention has been described with respect to preferred embodiments, it is not to be so limited as changes and modifications may be made which are within the full intended scope as defined by the appended claims.

We claim:

1. A circuit arrangement for side lobe suppression in radar devices comprising a primary directive radar antenna, a primary radar receiver connected to said primary radar antenna, an auxiliary omnidirectional antenna, an auxiliary receiver connected to said auxiliary antenna, a weighting multiplier receiving the output of said auxiliary receiver, an adder receiving the outputs of said weighting multiplier and said primary radar receiver, a change-over switch receiving the outputs of said adder and said primary radar receiver, a return loop connected to said weighting multiplier to vary its weighting factor and said return loop receiving the output of said adder and said auxiliary receiver, a first comparator (KP1) receiving an output of said return loop and connected to said change-over switch to supply either the output of said adder or said primary radar receiver to an output terminal, a second comparator (KP2) receiving the outputs of said adder and said primary radar receiver and connected to said change-over switch to supply either the output of said adder or said primary radar receiver to said output terminal, and a control characteristic device receiving the output of said auxiliary receiver, a gain control means with a gain control in said return loop and said control characteristic device connected to said gain control means whereby the weighting factor (V) is proportional to the square of the inverse noise signal ($S^2$) at the output of said auxiliary receiver according to the equation $V=(a/S^2)$ where a is a constant.

2. A circuit arrangement according to claim 1 characterized in that the amplification $V=(a/S^2)$ occurs in an amplifier (V2) which is mounted in said return loop between a corrolator (K) and said weighting multiplier (M) and said corrolator (K) receives the outputs of said adder and said auxiliary receiver.

3. A circuit arrangement according to claim 2 characterized in that a delay line (VZ) is mounted ahead of said change-over switch (U), and said delay line (VZ) causing a delay of the output signal which is equal to or greater than the measuring time in said comparison means (KP2).

4. A circuit arrangement according to claim 1 characterized in that the amplification $V=a/S^2$ occurs in an amplifier (V2) which receives the output of said adder and a corrolator (K) which receives the outputs of said amplifier (V2) and said auxiliary receiver.

5. A circuit arrangement according to claim 1 including a corrolator (K) and the amplification $V=a/S^2$ is accomplished in two separate amplifiers (V2′, V2″) with each respectively pre-connected to two inputs of said corrolator (K) and the gains of each being inversely proportional to the noise amplitude (S) in the auxiliary channel according to the equation $V'=(a/S)$.

* * * * *